US010224532B2

(12) United States Patent
Okamoto

(10) Patent No.: US 10,224,532 B2
(45) Date of Patent: Mar. 5, 2019

(54) DETECTION MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Ryouya Okamoto, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 63 days.

(21) Appl. No.: 15/535,530

(22) PCT Filed: Dec. 3, 2015

(86) PCT No.: PCT/JP2015/084002
§ 371 (c)(1),
(2) Date: Jun. 13, 2017

(87) PCT Pub. No.: WO2016/098605
PCT Pub. Date: Jun. 23, 2016

(65) Prior Publication Data
US 2017/0352859 A1 Dec. 7, 2017

(30) Foreign Application Priority Data
Dec. 17, 2014 (JP) .................................. 2014-255155

(51) Int. Cl.
*H01M 10/48* (2006.01)
*H01M 2/34* (2006.01)
(Continued)

(52) U.S. Cl.
CPC ............ *H01M 2/34* (2013.01); *H01M 2/1077* (2013.01); *H01M 2/206* (2013.01); *H01M 2/348* (2013.01);
(Continued)

(58) Field of Classification Search
CPC ...... H01M 2/34; H01M 2/1077; H01M 2/206; H01M 2/348; H01M 2200/103; H01M 2200/20; H01M 10/482
See application file for complete search history.

(56) References Cited

U.S. PATENT DOCUMENTS

| 4,842,534 A | 6/1989 | Mobley et al. |
| 6,146,788 A | 11/2000 | Ikeda et al. |

(Continued)

FOREIGN PATENT DOCUMENTS

| JP | 60-193227 | 10/1985 |
| JP | 11-120988 | 4/1999 |

(Continued)

OTHER PUBLICATIONS

International Search Report dated Feb. 16, 2016.

*Primary Examiner* — Jane J Rhee
(74) *Attorney, Agent, or Firm* — Gerald E. Hespos; Michael J. Porco; Matthew T. Hespos

(57) ABSTRACT

In a detection module to be mounted on a unit cell group formed by electrically connecting adjacent electrode terminals of a plurality of unit cells including positive and negative electrode terminals by busbars, a plurality of fuse units each configured such that a busbar connection terminal for detecting a state of the unit cell by being connected to the busbar, a wire connection terminal to be connected to an end part of a wire and a fuse for connecting the busbar connection terminal and the wire connection terminal are integrally assembled and accommodated in a housing made of syn- (Continued)

thetic resin are held in a holding member made of synthetic resin.

5 Claims, 18 Drawing Sheets

(51) Int. Cl.
*H01M 2/10* (2006.01)
*H01M 2/20* (2006.01)

(52) U.S. Cl.
CPC .... *H01M 10/482* (2013.01); *H01M 2200/103* (2013.01); *H01M 2220/20* (2013.01)

(56) References Cited

U.S. PATENT DOCUMENTS

| | | |
|---|---|---|
| 6,261,719 B1 | 7/2001 | Ikeda et al. |
| 2001/0027060 A1 | 10/2001 | Kondo et al. |
| 2013/0288530 A1 | 10/2013 | Zhao |
| 2014/0065468 A1 | 3/2014 | Nakayama |
| 2014/0322978 A1 | 10/2014 | Okamoto et al. |

FOREIGN PATENT DOCUMENTS

| | | |
|---|---|---|
| JP | 2000-149909 | 5/2000 |
| JP | 2001-110396 | 4/2001 |
| JP | 2001-283711 | 10/2001 |
| JP | 2013-16380 | 1/2013 |
| JP | 2013-106400 | 5/2013 |
| JP | 2013-114956 | 6/2013 |
| JP | 2015-507819 | 3/2015 |

DETECTION MODULE

BACKGROUND

1. Field of the Invention

The invention relates to a detection module.

2. Description of the Related Art

A power supply device for electric or hybrid vehicle has a cell assembly in which a plurality of unit cells having positive and negative electrode terminals are arranged and connected. Such a cell assembly includes plate-like busbars for electrically connecting the electrode terminals of adjacent unit cells. A detection terminal for detecting a voltage of the cell is connected to this busbar and a wire is connected to the detection terminal to be led to a battery ECU.

The above-described wire is for detecting the voltage of the unit cell, and therefore a relatively small current flows therein. However, the wire is connected to the electrode terminal of the unit cell, and the unit cells are shorted to each other if a plurality of wires are shorted to each other. Thus, to prevent a short circuit between the unit cells, it is proposed to attach fuses to the detection terminals. If the wires are shorted to each other, the fuses are fused to suppress a short circuit between the unit cells. Such fuses conventionally are connected to a detection circuit by being directly soldered to the detection terminals or individually mounting cell-side connectors incorporating fuses on the busbars and connecting the cell-side connectors to wire-side connectors. Japanese Unexamined Patent Publication No. 2001-110396 and Japanese Unexamined Patent Publication No. 2013-114956 are relevant to the above-described technology.

However, it has a problem of requiring time and labor for a mounting operation to directly solder the fuses to the detection terminals or individually mount the connectors incorporating the fuses on the busbars.

A technique disclosed in this specification aims to provide a detection module enabling fuses to be mounted easily.

SUMMARY

This specification is directed to a detection module to be mounted on a unit cell group formed by electrically connecting adjacent electrode terminals of a plurality of unit cells including positive and negative electrode terminals by busbars. The detection module has a plurality of fuse units, each of which has: a busbar connection terminal for detecting a state of the unit cell by being connected to the busbar, a wire connection terminal to be connected to an end part of a wire and a fuse for connecting the busbar connection terminal and the wire connection terminal. These components are assembled and accommodated integrally in a housing made of synthetic resin and are held in a holding member made of synthetic resin.

According to the above configuration, the fuse units are mounted in the holding member in advance and this detection module is mounted collectively on the unit cell group. Thus, the efficiency of a fuse mounting operation can be improved as compared to a conventional configuration for individually mounting a plurality of fuses or fuse units on busbars.

The fuse units may be held movably with respect to the holding member. According to this configuration, manufacturing tolerances and assembling tolerances of the holding member and the fuse units can be absorbed and electrical connection can be performed reliably.

The holding member may be provided with a plurality of holding walls enclosing the fuse units. The fuse units may be held inside the holding walls, and inner dimensions of the holding walls may be set to be larger than outer shape dimensions of the fuse units. By adopting this configuration, the fuse units can be held movably with respect to the holding member.

The holding member may be provided with a wire accommodation groove configured to accommodate the wires and extending along an arrangement direction of the fuse units. By adopting this configuration, the wires can be neatly accommodated.

According to this specification, it is possible to obtain a detection module enabling fuses to be easily mounted.

DETAILED DESCRIPTION

Figure 1:
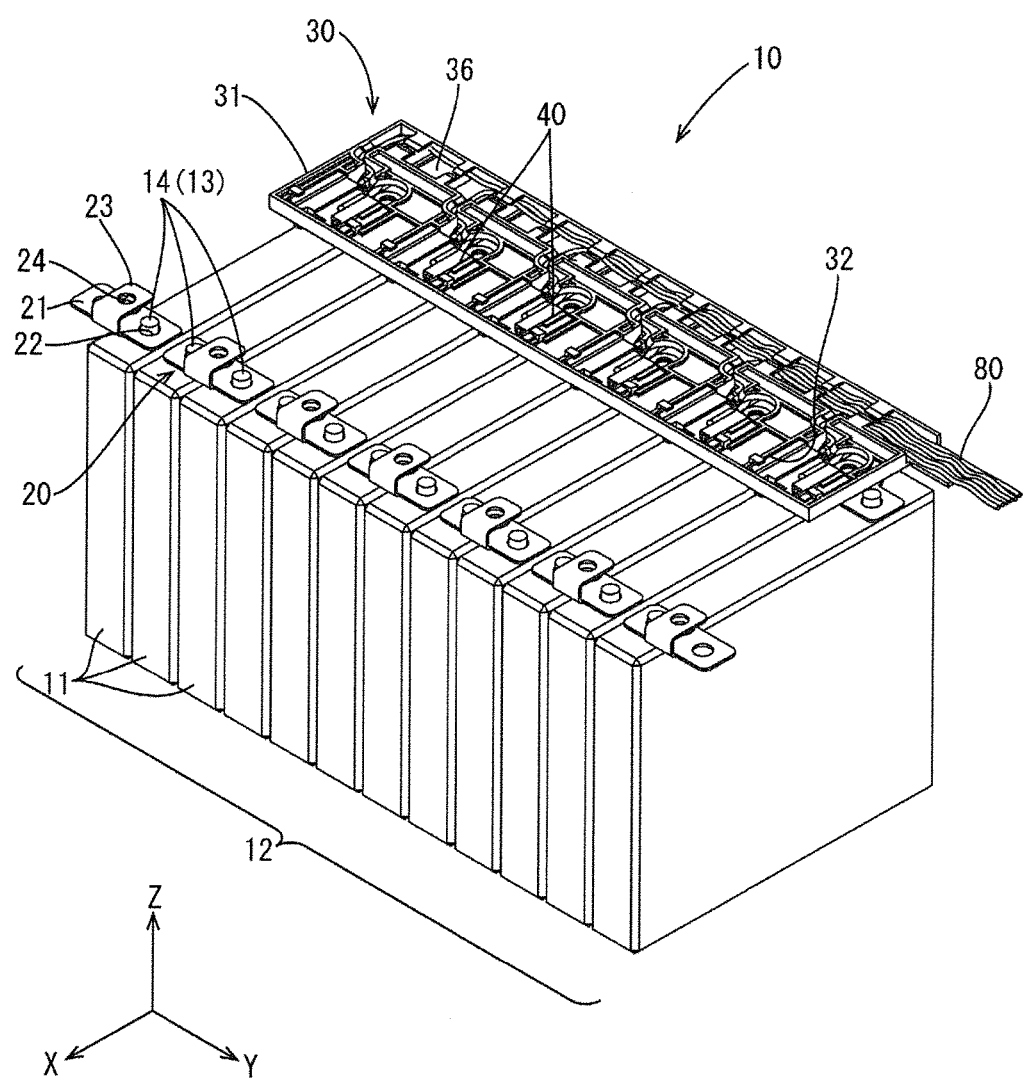
FIG. 1 is a perspective view of a battery module of one embodiment.

One embodiment in which a detection module 30 described in this specification is applied to a battery module 10 is described with reference to FIGS. 1 to 18.

The battery module 10 according to this embodiment is installed in a vehicle (not shown) such as an electric or hybrid vehicle and used as a power supply for driving the vehicle. The battery module 10 includes a unit cell group 12 in which plural unit cells 11 having positive and negative electrode terminals 13 are arranged side by side. A plurality of adjacent electrode terminals 13 are connected electrically by busbars 20 (see FIG. 1).

In the following description, an X direction in FIG. 1 is referred to as a forward direction and a direction opposite to the X direction is referred to as a rearward direction. Further, a Y direction in FIG. 1 is referred to as a rightward direction and a direction opposite to the Y direction is referred to as a leftward direction. Furthermore, a Z direction in FIG. 1 is referred to as an upward direction and a direction opposite to the Z direction is referred to as a downward direction.

(Unit Cell 11)

As shown in FIG. 1, the unit cell 11 has a flat and substantially rectangular parallelepiped shape. An unillustrated power generating element is accommodated in the unit cell 11. Two electrode terminals 13, 13 project up at positions near both ends in a longitudinal direction on the upper surface of the unit cell 11. The upper surface of the unit cell 11 serves as an electrode surface. One of the electrode terminals 13 is a positive electrode terminal and the other is a negative electrode terminal. The positive electrode terminal 13 and the negative electrode terminal 13 are shaped and sized identically. The electrode terminal 13 includes an electrode post 14 in the form of a round bar projecting up from a terminal block (not shown) made of metal, and an external thread is formed on an outer surface of the electrode post 14. The unit cells 11 are arranged such that adjacent electrode terminals 13 have different polarities. The plurality of unit cells 11 are arranged side by side in a Y-axis direction in FIG. 1 and the adjacent unit cells 11 are connected electrically by the busbars 20, thereby configuring the unit cell group 12.

(Busbar 20)

The busbar 20 is formed by press-working a metal plate material such as copper, copper alloy, stainless steel (SUS) or aluminum into a predetermined shape and includes, as shown in FIG. 1, a plate-like body 21 having a substantially rectangular shape and an L-shaped fuse unit connecting portion 23 formed to stand up from a central part of one of a pair of long side edges of the body 21. Metal, such as tin or nickel, may be plated on the surface of the busbar 20.

Two circular terminal through holes 22 penetrate through the plate surfaces of the body 21 of the busbar 20 and the electrode posts 14 of the positive and negative electrode terminals 13 of the unit cells 11 are inserted therethrough. These terminal through holes 22 are slightly larger in diameter than the electrode posts 14. By threadably engaging a nut (not shown) with the electrode post 14 passed through the terminal through hole 22 and sandwiching the body 21 between the nut and the terminal block, the electrode terminal 13 and the busbar 20 are connected electrically.

Further, a circular bolt through hole 24 penetrates through the plate surfaces of a part of the fuse unit connecting portion 23 arranged to face the body 21 and a connection bolt (not shown) is to be inserted therethrough.

(Detection Module 30)

Figure 4:
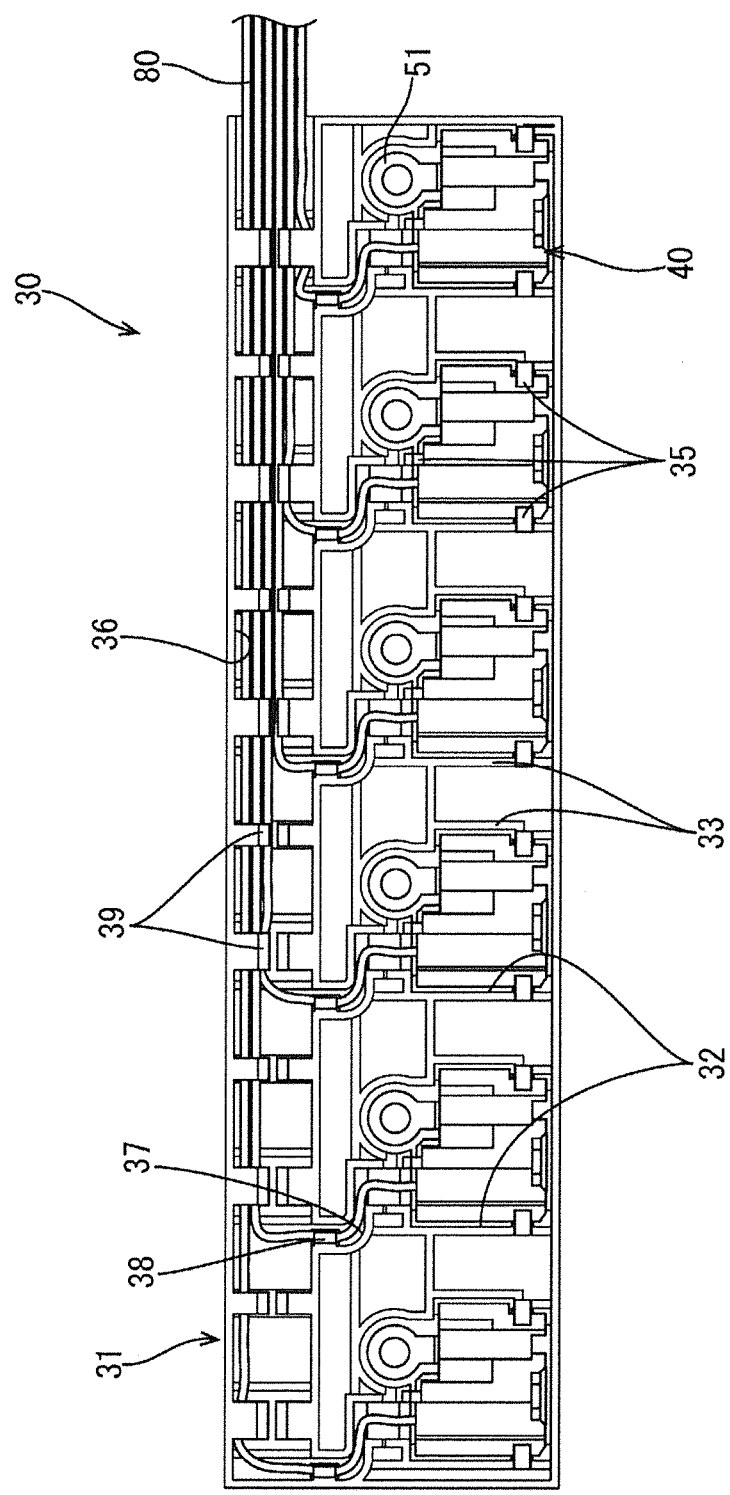
FIG. 4 is a plan view of a detection module.
Figure 5:
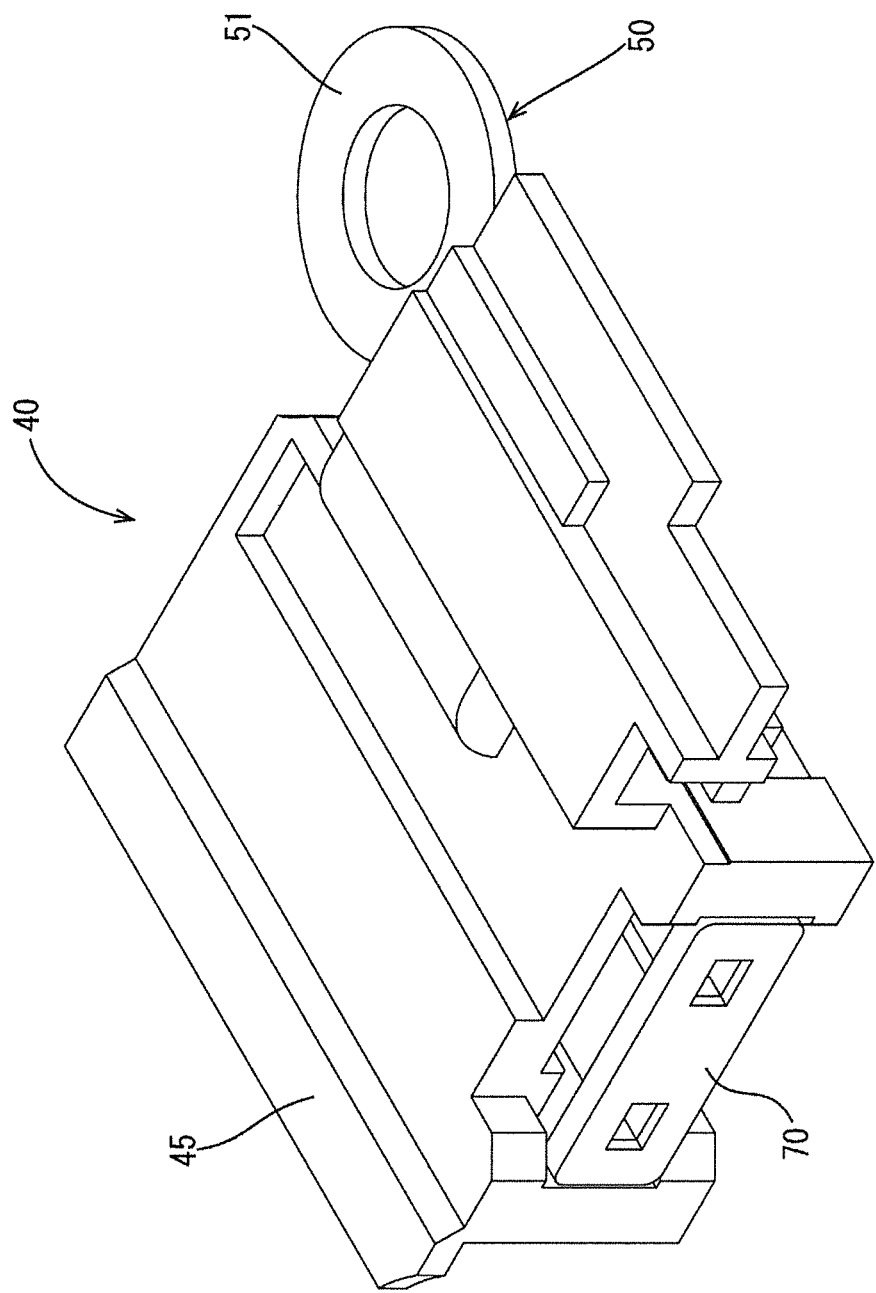
FIG. 5 is a perspective view of a fuse unit.
Figure 6:
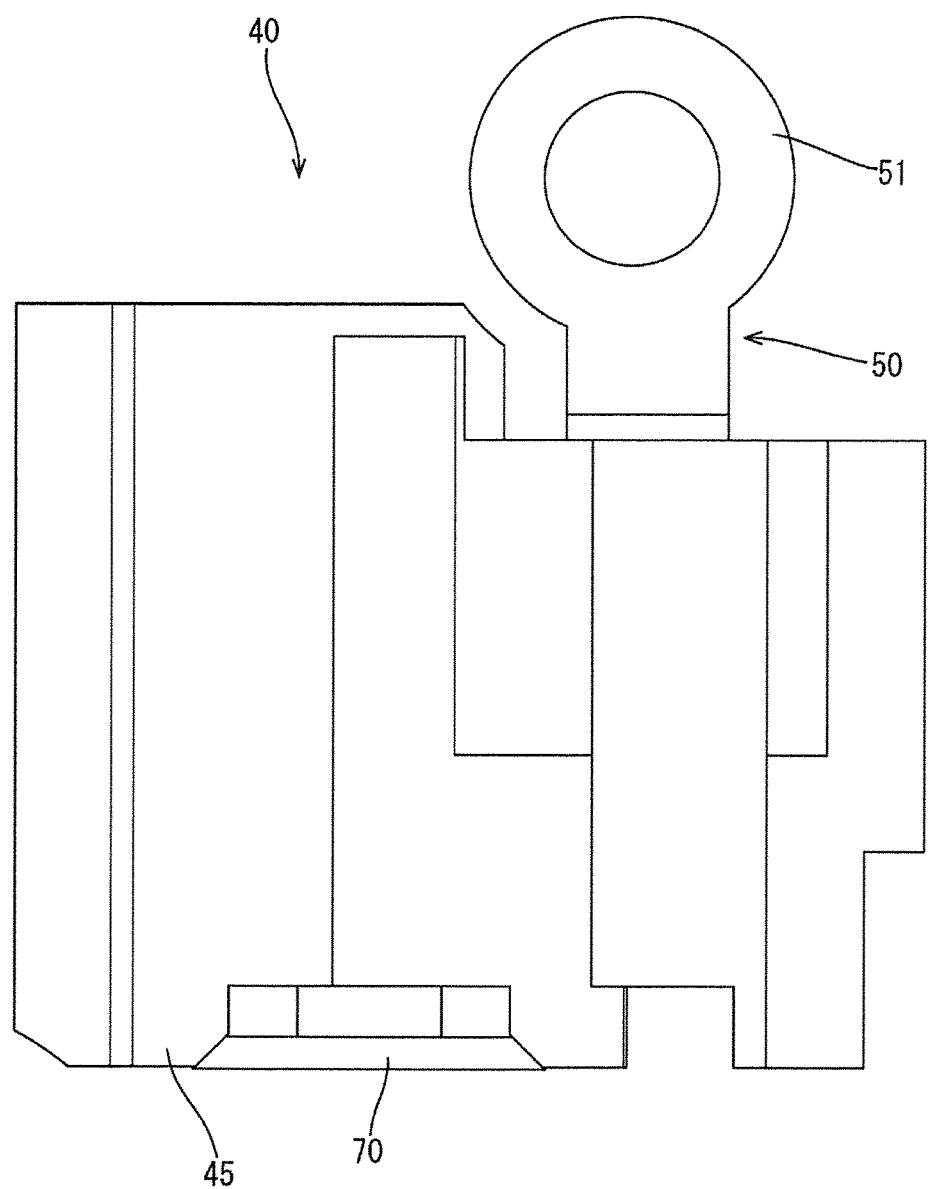
FIG. 6 is a plan view of the fuse unit.
Figure 7:
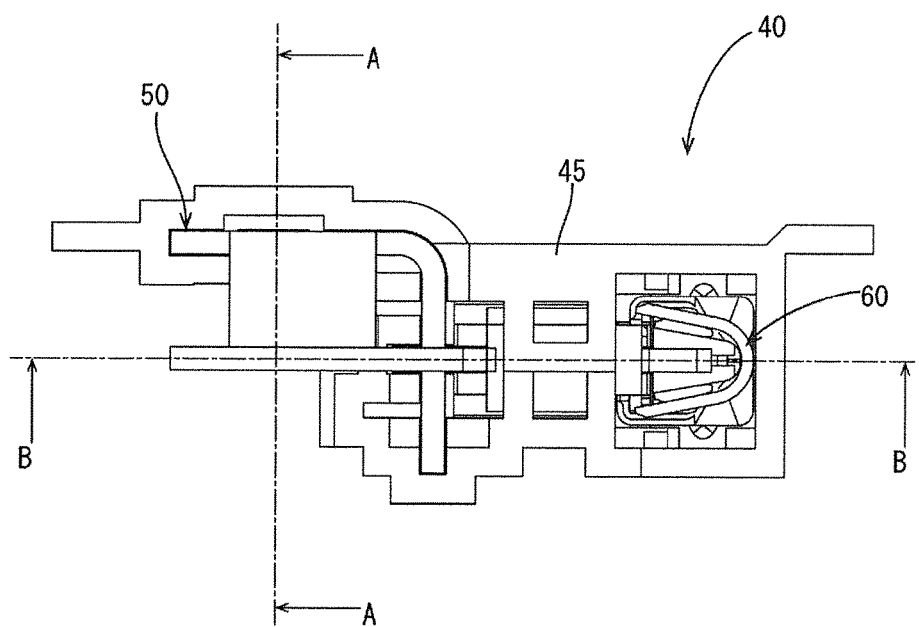
FIG. 7 is a back view of the fuse unit.
Figure 8:
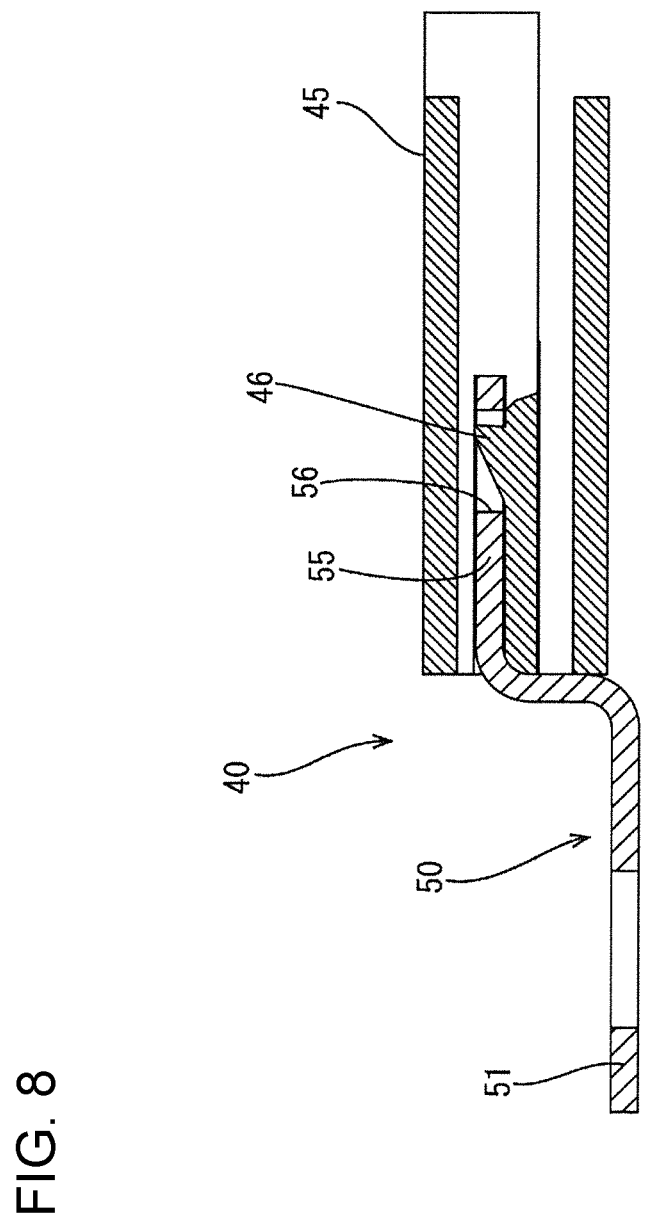
FIG. 8 is a section along A-A of FIG. 7.
Figure 9:
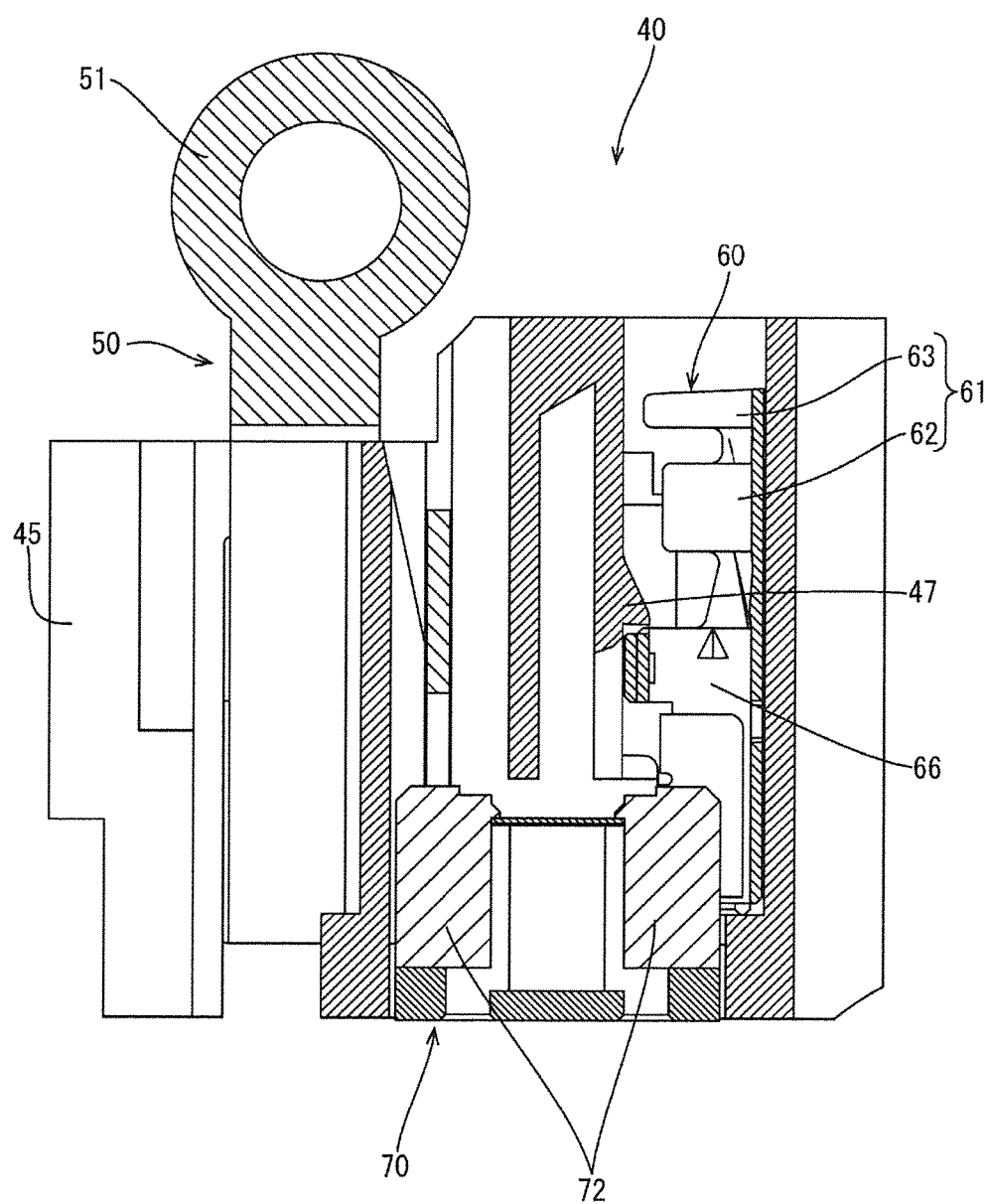
FIG. 9 is a section along B-B of FIG. 7.

The detection module 30 includes a plurality of fuse units 40 to be described later, a plurality of detection wires 80 connected to these fuse units 40 and a resin protector 31 made of synthetic resin and having a plurality of unit holding portions 32 for holding the fuse units 40 and a wire accommodation groove 36 for accommodating the detection wires 80 (see FIG. 4).

(Resin Protector 31)

As shown in FIG. 1, the resin protector 31 is long and narrow in an arrangement direction (Y direction) of the unit cells 11.

Figure 2:
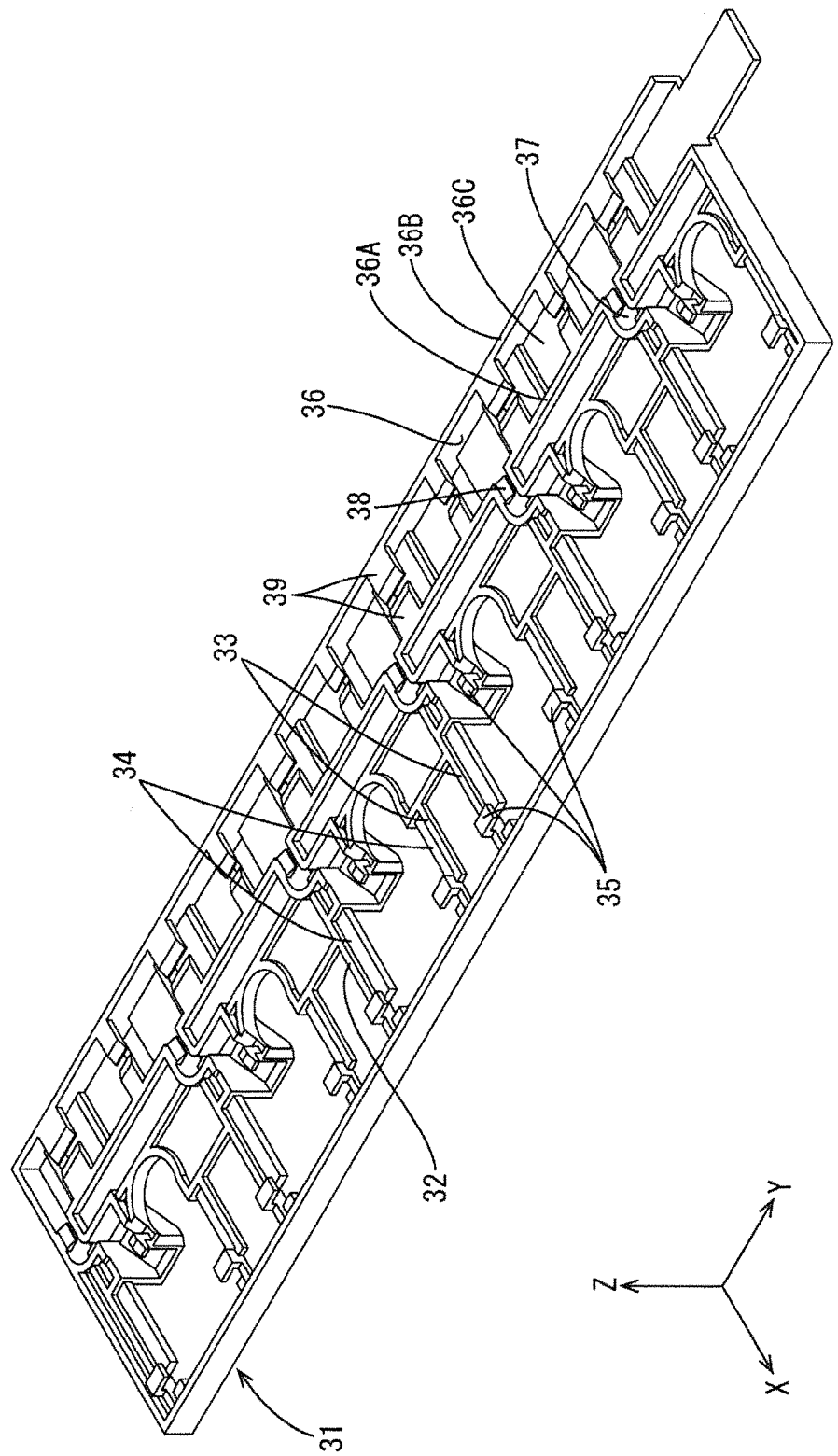
FIG. 2 is a perspective view of a resin protector.
Figure 3:
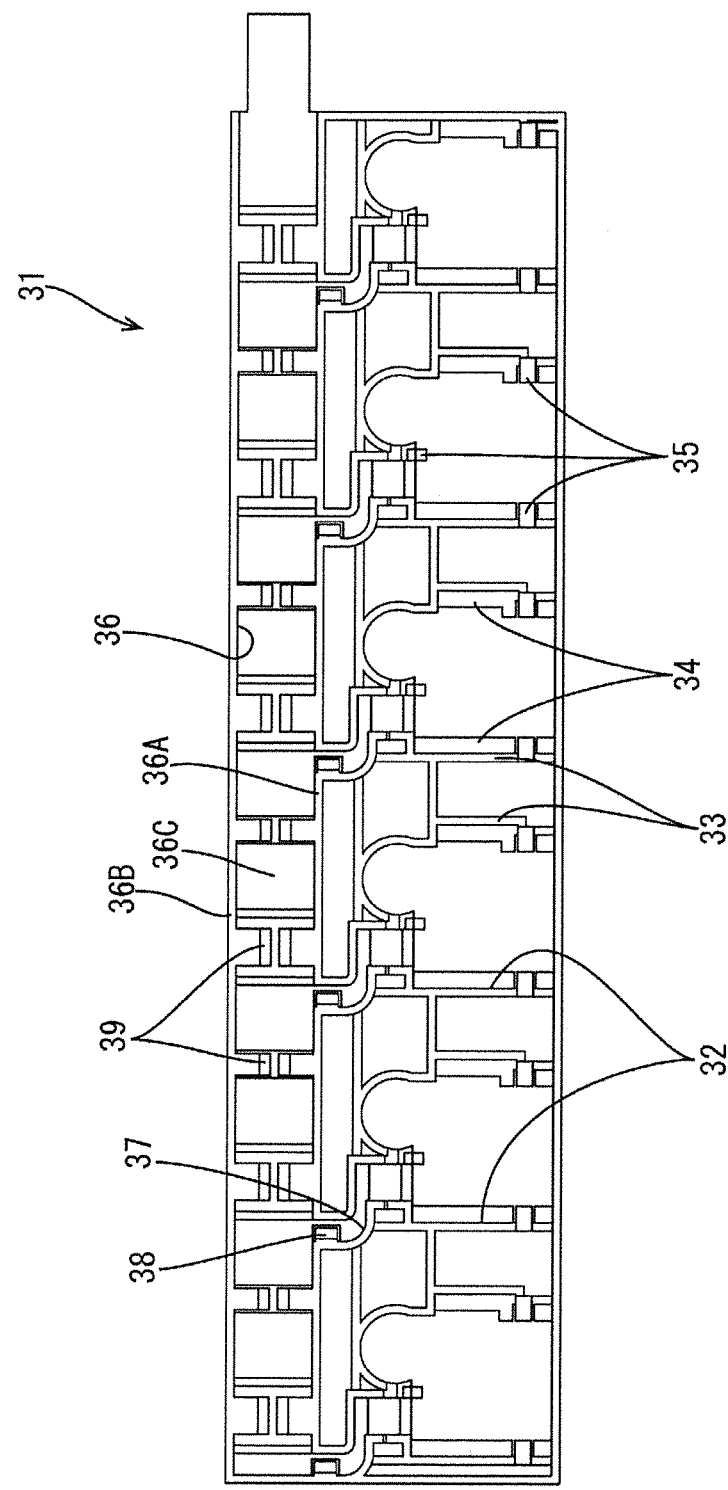
FIG. 3 is a plan view of the resin protector.

As shown in FIGS. 2 and 3, the unit holding portions 32 are provided side by side in a longitudinal direction in the resin protector 31 and are open on one surface side (upper surface). The unit holding portions 32 are configured to accommodate and hold the fuse units 40. The wire accommodation groove 36 is provided along an arrangement direction (Y direction) of the unit holding portions 32 and accommodates the detection wires 80 connected to the fuse units 40.

Each unit holding portion 32 is enclosed by a holding wall 33 standing upward and accommodating and holding the fuse unit 40 inside. The holding wall 33 is arranged into a shape in conformity with an outer shape of the fuse unit 40. Inner dimensions of the unit holding portion 32 (holding wall 33) are slightly larger than outer shape dimensions of the fuse unit 40, so that the fuse unit 40 accommodated in the unit holding portion 32 is movable in horizontal directions (X, Y directions) in the unit holding portion 32 (see FIG. 4).

A bottom part of the unit holding portion 32 is open down except at a pair of placing portions 34 on which edge parts of the bottom surface of the fuse unit 40 are to be placed. These placing portions 34 are provided on parts of the holding wall 33 located on left and right sides of the unit holding portion 32 in FIG. 3.

Further, three L-shaped holding protrusions 35 are formed on the holding wall 33 to project inward of the unit holding portion 32. The holding protrusions 35 are arranged above the fuse unit 40 accommodated in the unit holding portion 32 and having a function of holding the fuse unit 40 together with the placing portions 34. These holding protrusions 35 are provided on the upper ends of the parts of the holding wall 33 located on the left and right sides of the unit holding portion 32 and a part of the holding wall 33 located on an upper side in FIG. 3.

The wire accommodation groove 36 includes two groove walls 36A, 36B and a bottom portion 36C, and is provided along the arrangement direction (Y direction) of the unit holding portions 32. A plurality of detection wires 80 can be accommodated into this wire accommodation groove 36.

Parts of the groove wall 36A on the side of the unit holding portions 32 and parts of the holding walls 33 of the unit holding portions 32 on the side of the wire accommodation groove 36 are cut and communicate with through grooves 37 located between the wire accommodation groove 36 and the unit holding portions 32 and enable the detection wires 80 to be introduced into the wire accommodation groove 36 from the side of the unit holding portions 32.

These through grooves 37 are Z-shaped in a plan view from the unit holding portions 32 toward the wire accommodation groove 36, and pressing pieces 38 project on the upper ends of end parts on the side of the wire accommodation groove 36 for preventing the protrusion of the detection wires 80 by covering parts of the through grooves 37 from above.

Further, a multitude of pressing pieces 39 are provided at positions facing each other at the upper ends of the groove walls 36A, 36B of the wire accommodation groove 36 for preventing the protrusion of the detection wires 80 by covering parts of the wire accommodation groove 36 from above.

(Fuse Unit 40)

The fuse unit 40 for detecting a voltage of the unit cell 11 by being connected to the busbar 20 is arranged in the unit holding portion 32 of the resin protector 31.

The fuse unit 40 is formed such that a busbar connection terminal 50 to be connected to the busbar 20, a wire connection terminal 60 to be connected to an end part of the detection wire and a fuse 70 for electrically connecting the busbar connection terminal 50 and the wire connection terminal 60 are assembled integrally and accommodated in a housing 45 made of synthetic resin (see FIGS. 5 to 9).

(Busbar Connection Terminal 50)

The busbar connection terminal 50 is formed by press-working a metal plate material such as copper, copper alloy, stainless steel or aluminum into a predetermined shape. The busbar connection terminal 50 detects a state of the unit cell 11 by being electrically connected to the busbar 20.

Figure 10:
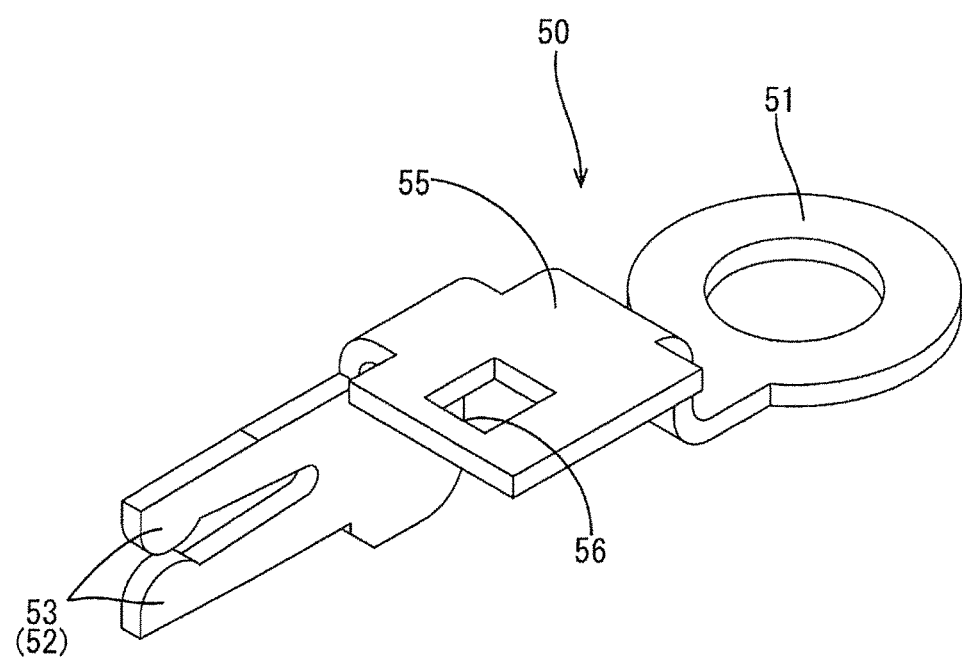
FIG. 10 is a perspective view of a busbar connection terminal.

As shown in FIG. 10, the busbar connection terminal 50 is formed such that a busbar connecting portion 51 in the form of a round terminal to be electrically connected to the fuse unit connecting portion 23 of the busbar 20 described above by fastening a bolt and a nut (not shown) and a fuse receiving portion 52 to be connected to the fuse 70 extend toward mutually opposite sides from a linking portion 55 in the form of a flat plate.

The fuse receiving portion 52 is composed of a pair of clamping pieces 53 that define a so-called a tuning fork terminal formed by forming a slot in a leading end of a flat plate into which a later-described fuse-side connection terminal 72 in the form of a flat plate is to be press-fit. The linking portion 55 is provided with an engaging hole 56 used to mount the busbar connection terminal 50 into the housing 45 to be described later.

(Wire Connection Terminal 60)

Figure 11:
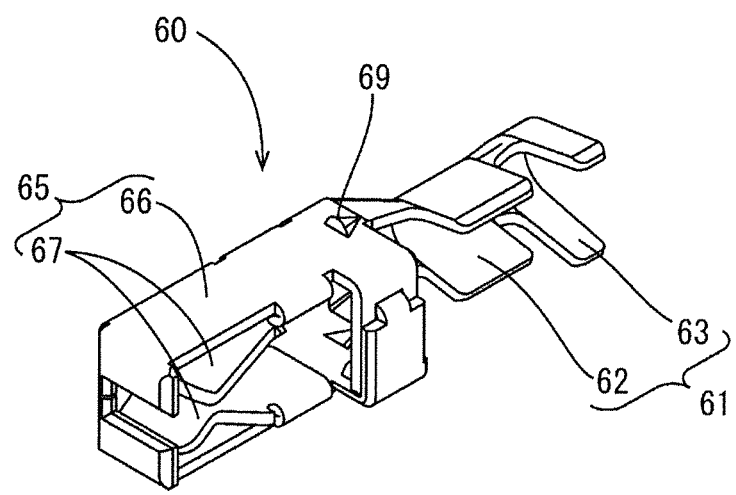
FIG. 11 is a perspective view of a wire connection terminal.

As shown in FIG. 11, the wire connecting portion 60 is formed such that a wire connecting portion 61 to be connected to the end part of the detection wire 80 and a fuse receiving portion 65 to be connected to the fuse 70 extend toward mutually opposite sides.

The wire connecting portion 61 is composed of a core connecting portion 62 in the form of a barrel to be crimped to an exposed core (not shown) of the detection wire 80 and a holding portion 63 in the form of a barrel provided at a leading end side of the core connecting portion 62 and to be crimped to the periphery of a part of the detection wire 80 covered with an insulation coating.

On the other hand, the fuse receiving portion 65 is provided with a pair of resilient contact pieces 67 capable of resiliently contacting the fuse-side connection terminal 72 in the form of a flat plate inside a rectangular tube portion 66 having a rectangular tube shape. Further, a locking projection 69 is provided on an outer surface of the rectangular tube portion 66 and is to be mounted into the housing 45 to be described later.

(Fuse 70)

Figure 12:
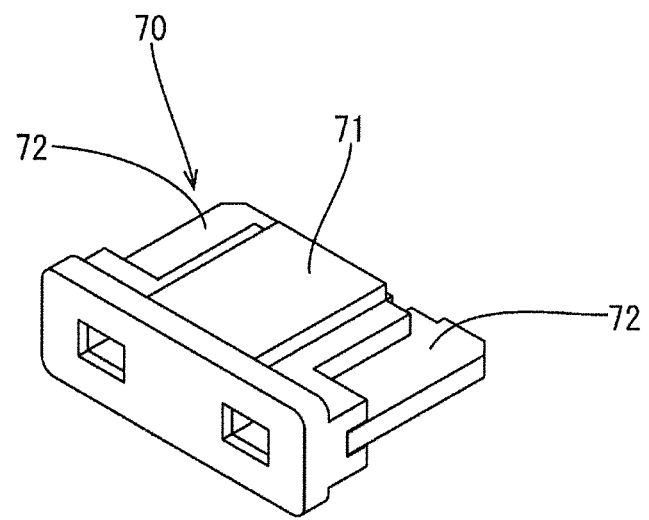
FIG. 12 is a perspective view of a fuse.
Figure 13:
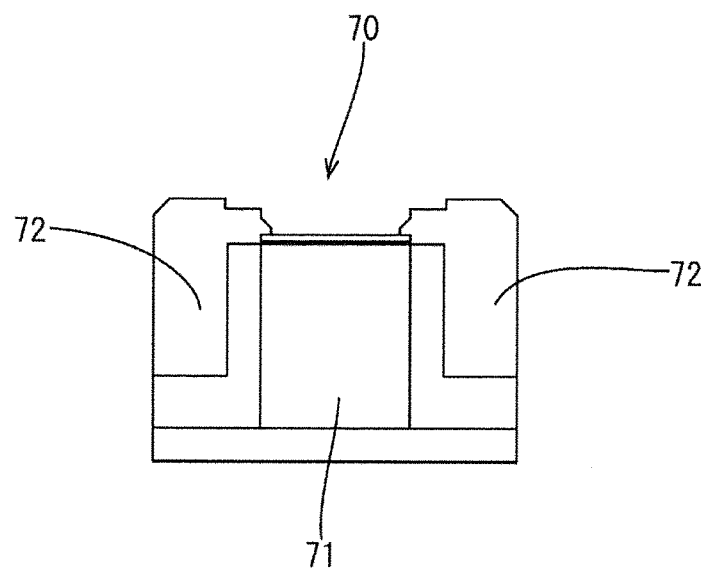
FIG. 13 is a plan view of the fuse.
Figure 14:
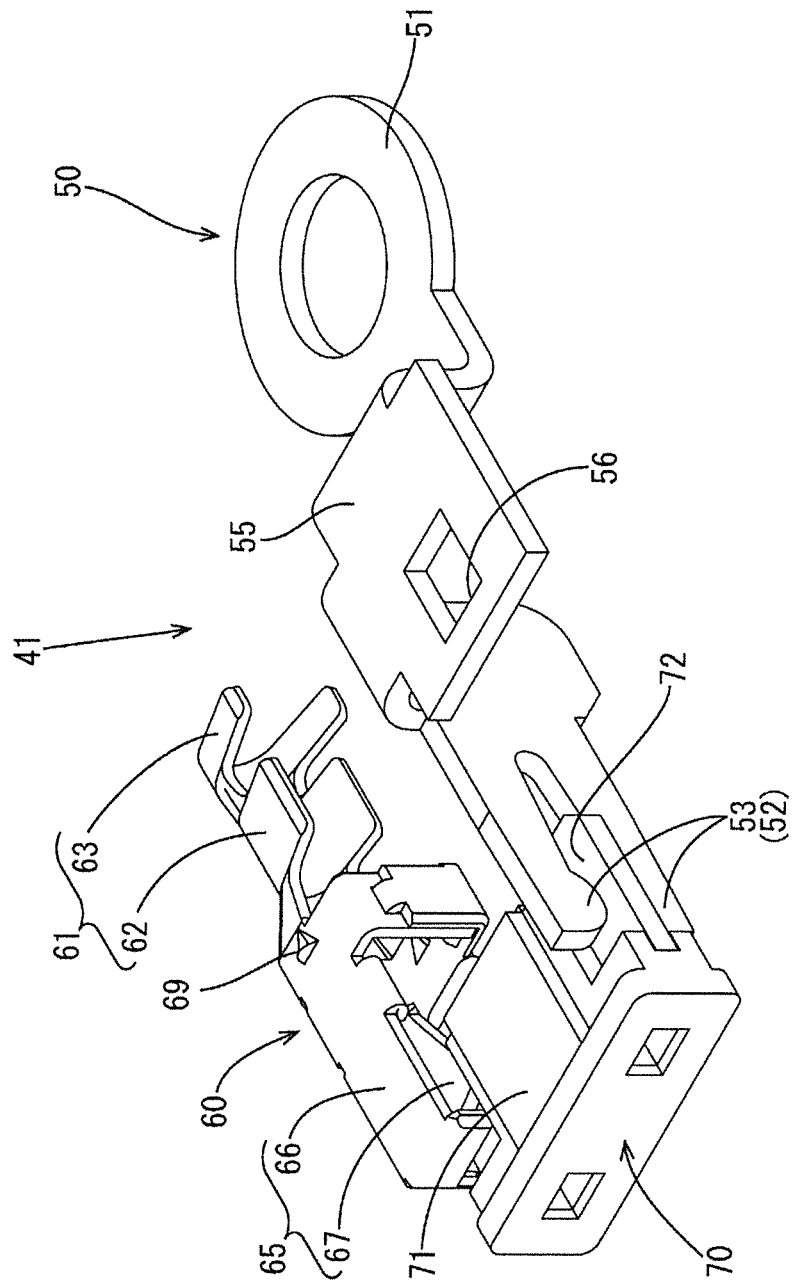
FIG. 14 is a perspective view of an assembly.
Figure 15:
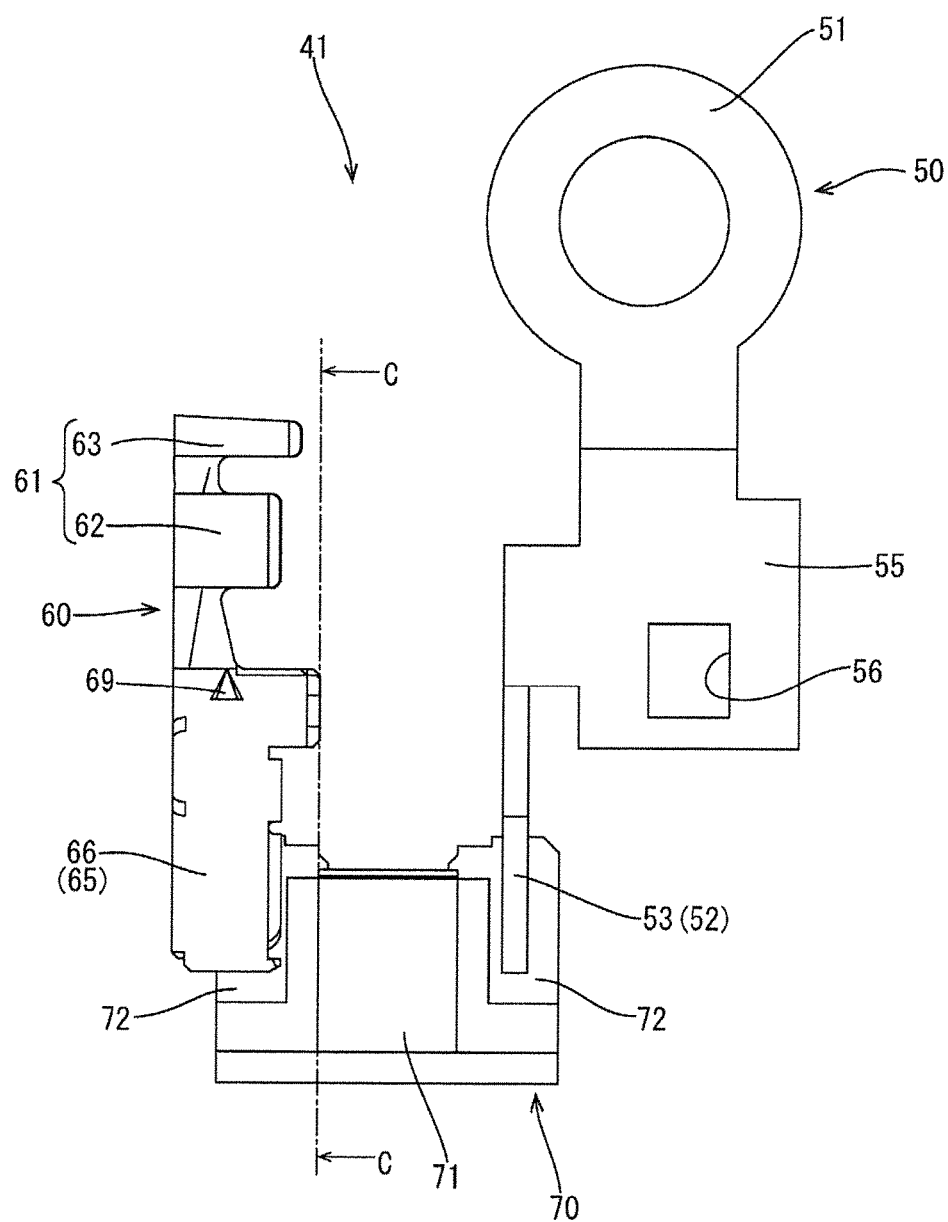
FIG. 15 is a plan view of the assembly.
Figure 16:
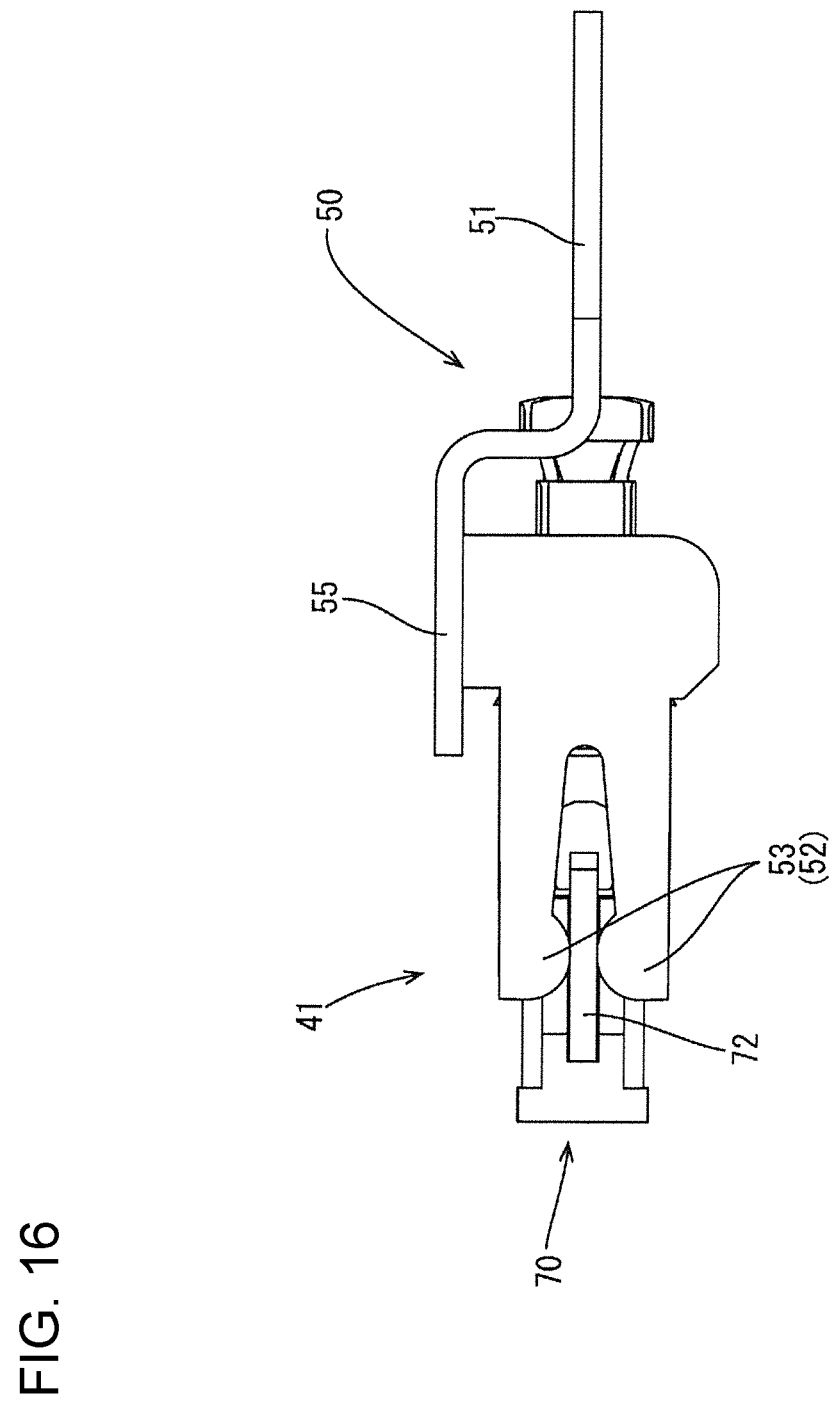
FIG. 16 is a right side view of the assembly.
Figure 17:
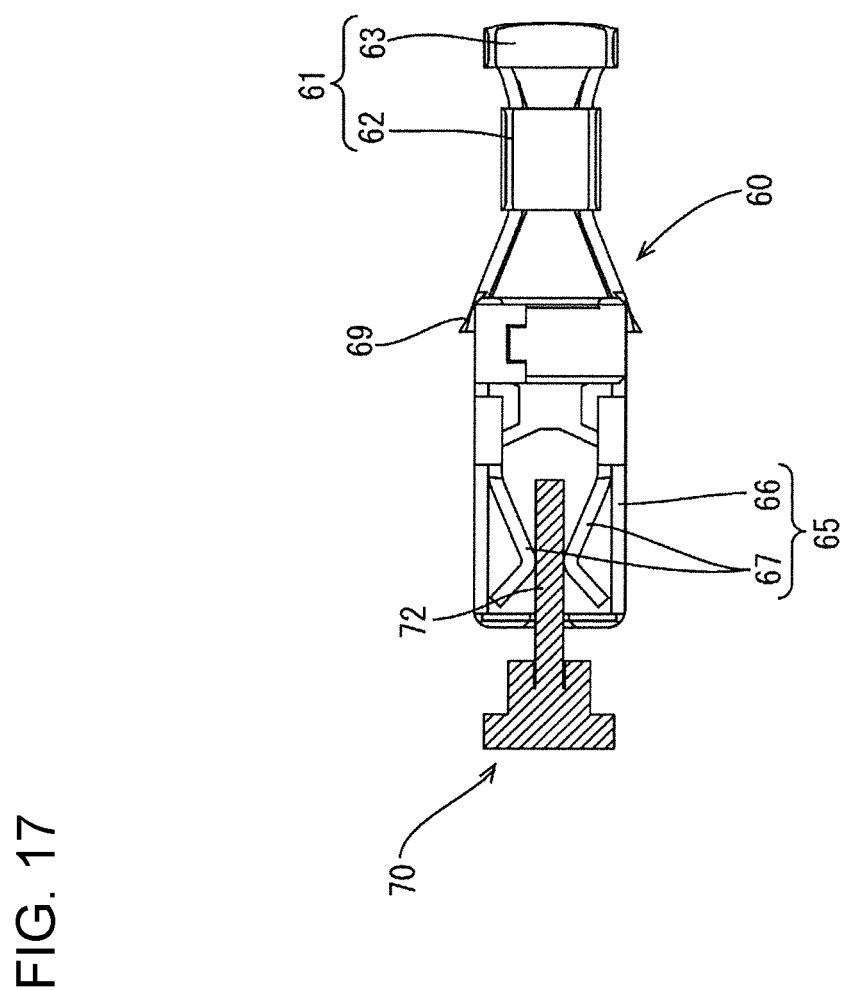
FIG. 17 is a section along C-C of FIG. 15.

As shown in FIGS. 12 and 13, the fuse 70 is, for example, a general-purpose article with two fuse-side connection terminals 72 exposed respectively from both sides of a resin holder 71 T-shaped in a plan view. The fuse-side connection terminals 72 are inserted and clamped between the pair of clamping pieces 53 of the fuse receiving portion 52 of the busbar connection terminal 50 and between the pair of resilient contact pieces 67 of the fuse receiving portion 65 of the wire connecting portion 60 while resiliently deforming the clamping pieces 53 and the resilient contact pieces 67 outward (see FIGS. 16 and 17).

The integral assembly of these busbar connection terminal 50, wire connection terminal 60 and fuse 70 is called an assembly 41 below (see FIGS. 14 to 17).

(Housing 45)

Figure 18:
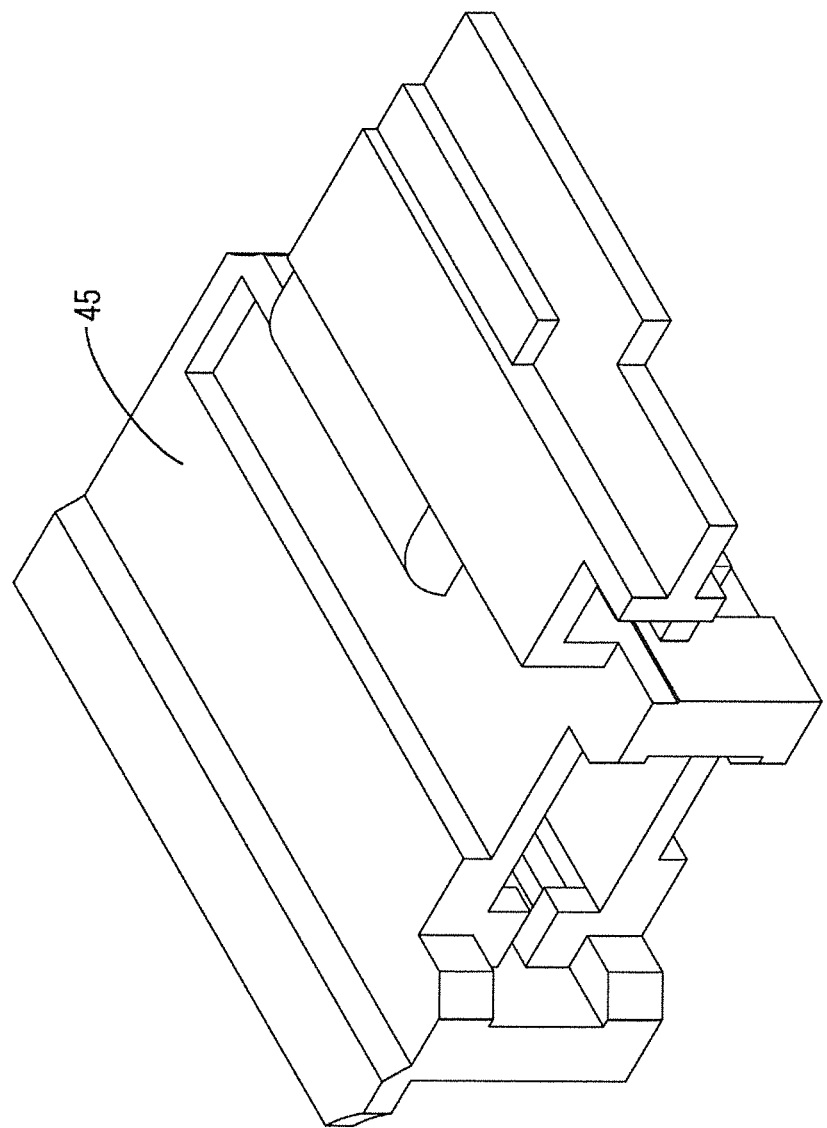
FIG. 18 is a perspective view of a housing.

The housing 45 is made of synthetic resin formed into a casing shape shown in FIG. 18, and the aforementioned assembly 41 can be accommodated into the housing 45. An engaging protrusion 46 (see FIG. 8) engageable with the engaging hole 56 of the aforementioned busbar connection terminal 50 and a locking protrusion 47 (see FIG. 9) lockable to the back surface of the rectangular tube portion 66 of the wire connection terminal 60 are provided inside the housing 45. The engaging protrusion 46 and the locking protrusion 47 are engaged with and locked to the engaging hole 56 of the busbar connection terminal 50 and the rectangular tube portion 66 of the wire connection terminal 60 so that the assembly 41 is retained in the housing 45.

The assembly 41 is accommodated into the housing 45, thereby forming the fuse unit 40 (see FIGS. 5 to 9).

(Assembling Method of Detection Module 30)

In assembling the aforementioned detection module 30 of this embodiment, the fuse units 40 connected to the detection wires 80 are accommodated into the unit holding portions 32 of the resin protector 31 and the detection wires 80 drawn out from the fuse units 40 are introduced and arranged into the wire accommodation groove 36 through the through grooves 37.

The holding walls 33 of the unit holding portions 32 and the fuse units 40 are dimensioned so that tiny clearances are formed between the inner surfaces of the holding walls 33 of the unit holding portions 32 and the fuse units 40. Thus, the fuse units 40 are slightly movable in the horizontal directions (X, Y directions) in the unit holding portions 32.

Further, the detection wires 80 are bent along the shape of the through holes 37 and introduced into the wire accommodation groove 36 from the unit holding portions 32.

Subsequently, the detection module 30 assembled in this way is arranged on the upper surface side of the unit cell group 12 and connected to the busbars 20 mounted in advance. Specifically, the busbar connecting portion 51 in the form of a round terminal of the fuse unit 40 is overlapped with the fuse unit connecting portion 23 of the busbar 20, the bolt is inserted and the nut is fastened so that the fuse unit 40 and the busbar 20 are connected electrically.

At this time, since the fuse units 40 are slightly movable in the horizontal directions (X, Y direction) in the unit holding portions 32, as described above, even if the unit cell group 12 and the busbars 20 have manufacturing tolerances and assembling tolerances, those tolerances can be absorbed.

In this way, the battery module 10 is completed.

Functions and Effects of Embodiment

According to the detection module 30 of this embodiment, the plurality of fuse units 40 can be mounted collectively on the unit cell group 12. Thus, a mounting operation is simpler as compared to a configuration for individually mounting the fuse units 40 on the busbars 20.

Each fuse unit 40 is held movably in each unit holding portion 32 of the resin protector 31. Thus, manufacturing tolerances and assembling tolerances can be absorbed and electrical connection can be performed reliably.

Furthermore, since the resin protector 31 is provided with the wire accommodation groove 36 for accommodating the detection wires 80, the detection wires 80 can be accommodated neatly.

The invention is not limited to the above described and illustrated embodiment. For example, the following embodiments are also included in the technical scope.

The form of the fuse unit 40 is not limited to that of the above embodiment, and another configuration may be used.

Further, the resin protector 31 (holding member) is also not limited to that of the above embodiment, and the design thereof can be changed in accordance with the form of the fuse units 40 to be used.

Although the fuse unit 40 is held movably with respect to the resin protector 31 (holding member) in the above embodiment, the fuse unit 40 may be immovably held.

The wire accommodation groove 36 is not always necessary and the detection wires 80 may be in a free state.

Although an example of the configuration for detecting the voltages of the unit cells is shown in the above embodiment, there is no limitation to this. For example, terminals for detecting another state of the unit cells such as currents flowing in the unit cells or temperatures may be provided.

LIST OF REFERENCE SIGNS

10: battery module
11: unit cell

12: unit cell group
13: electrode terminal
20: busbar
21: body
23: fuse unit connecting portion
30: detection module
31: resin protector (holding member)
32: unit holding portion
33: holding wall
36: wire accommodation groove
40: fuse unit
41: fuse assembly
45: housing
50: busbar connection terminal
60: wire connection terminal
70: fuse
80: detection wire

The invention claimed is:

1. A detection module to be mounted on a unit cell group formed by electrically connecting adjacent electrode terminals of a plurality of unit cells including positive and negative electrode terminals by busbars, wherein:
a plurality of fuse units each configured such that a busbar connection terminal for detecting a state of the unit cell by being connected to the busbar, a wire connection terminal to be connected to an end part of a wire and a fuse for connecting the busbar connection terminal and the wire connection terminal are integrally assembled and accommodated in a housing made of synthetic resin are held in a holding member made of synthetic resin.

2. The detection module of claim 1, wherein the fuse units are held movably with respect to the holding member.

3. The detection module of claim 2, wherein the holding member is provided with a plurality of holding walls enclosing the fuse units, the fuse units are held inside the holding walls, and inner dimensions of the holding walls are set to be larger than outer shape dimensions of the fuse units.

4. The detection module of claim 3, wherein the holding member is provided with a wire accommodation groove configured to accommodate the wires and extending along an arrangement direction of the fuse units.

5. The detection module of claim 1, wherein the holding member is provided with a wire accommodation groove configured to accommodate the wires and extending along an arrangement direction of the fuse units.

* * * * *